(12) United States Patent
Dong et al.

(10) Patent No.: US 10,191,286 B2
(45) Date of Patent: Jan. 29, 2019

(54) OPTICAL IMAGING STRUCTURE AND VIRTUAL REALITY SPECTACLES

(71) Applicants: BOE Technology Group Co., Ltd., Beijing (CN); Beijing BOE Optoelectronics Technology Co., Ltd., Beijing (CN)

(72) Inventors: Ruijun Dong, Beijing (CN); Dong Chen, Beijing (CN); Hao Zhang, Beijing (CN); Lili Chen, Beijing (CN); Chenru Wang, Beijing (CN); Xuebing Zhang, Beijing (CN); Yali Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/704,132

(22) Filed: Sep. 14, 2017

(65) Prior Publication Data

US 2018/0231781 A1 Aug. 16, 2018

(30) Foreign Application Priority Data

Feb. 16, 2017 (CN) .......................... 2017 1 0084201

(51) Int. Cl.
*G02B 27/01* (2006.01)
*F21V 8/00* (2006.01)
*G06T 15/00* (2011.01)

(52) U.S. Cl.
CPC ........ *G02B 27/0172* (2013.01); *G02B 6/0011* (2013.01); *A63F 2300/8082* (2013.01); *G06T 15/00* (2013.01)

(58) Field of Classification Search
CPC ... G02B 27/0172; G02B 6/0011; G06T 15/00; A63F 2300/8082
See application file for complete search history.

(56) References Cited

U.S. PATENT DOCUMENTS

2008/0316605 A1* 12/2008 Hazell ................. G02B 6/0033
359/630
2009/0097127 A1* 4/2009 Amitai ................ G02B 6/0018
359/633

(Continued)

*Primary Examiner* — Abhishek Sarma
(74) *Attorney, Agent, or Firm* — Westman, Champlin & Koehler, P.A.

(57) ABSTRACT

The present disclosure provides an optical imaging structure and virtual reality spectacles. In one embodiment, an optical imaging structure includes: an eyeglass component; and at least one light guide wall distributed along an edge of the eyeglass component, wherein, two opposite end faces of the at least one light guide wall are respectively a light incoming face and a light outgoing face; wherein, an inner rim of the light outgoing face joins the edge of the eyeglass component and extends in an optical axis direction of the eyeglass component, and, the light outgoing face is gradually distanced from the eyeglass component from the inner rim to an outer rim of the light outgoing face; and wherein, the at least one light guide wall includes a first light guide wall and a second light guide wall respectively disposed at left and right sides of the eyeglass component.

19 Claims, 6 Drawing Sheets

(56) References Cited

U.S. PATENT DOCUMENTS

2012/0218481 A1* 8/2012 Popovich ............. G02B 5/1819
  349/11
2013/0242392 A1* 9/2013 Amirparviz ........ G02B 27/0172
  359/485.05

* cited by examiner

OPTICAL IMAGING STRUCTURE AND VIRTUAL REALITY SPECTACLES

CROSS-REFERENCE TO RELATED APPLICATION

This application claims priority to Chinese Patent Application No. 201710084201.8 filed on Feb. 16, 2017 in the State Intellectual Property Office of China, the present disclosures of which are hereby incorporated by reference in their entirety.

TECHNICAL FIELD

The present disclosure relates to the technical field of display, and particularly, to an optical imaging structure and virtual reality spectacles.

BACKGROUND

There are various types of virtual reality spectacles. Immersion virtual reality spectacles are one type of non-transparent virtual reality spectacles.

SUMMARY

According to one aspect of the present disclosure, there is provided an optical imaging structure, and the optical imaging structure comprises:

an eyeglass component for observation by left and right eyes; and at least one light guide wall distributed along an edge of the eyeglass component, wherein, two opposite end faces of the at least one light guide wall are respectively a light incoming face and a light outgoing face, and the light outgoing face of the at least one light guide wall faces towards an observation side of the optical imaging structure;

wherein, the at least one light guide wall protrudes over the eyeglass component in a direction from the light incoming face to the light outgoing face of the at least one light guide wall, an inner rim of the light outgoing face of the at least one light guide wall joins the edge of the eyeglass component and extends in an optical axis direction of the eyeglass component, and, the light outgoing face of the at least one light guide wall is gradually distanced from the eyeglass component from the inner rim to an outer rim of the light outgoing face; and wherein, the at least one light guide wall comprises at least a first light guide wall and a second light guide wall respectively disposed at left and right sides of the eyeglass component.

In some embodiments, the light outgoing face of the at least one light guide wall is embodied as a sloping face.

In some embodiments, the at least one light guide wall further comprises a third light guide wall disposed at an upper side of the eyeglass component.

In some embodiments, the light guide wall disposed at the same side of the eyeglass component is formed by adjoining a plurality of light guide tubes paralleled with one another together.

In some embodiments, the light incoming face of the light guide wall disposed at the same side of the eyeglass component is formed as a dense plane consisted of end surfaces of the light guide tubes, and the light outgoing face of the light guide wall disposed at the same side of the eyeglass component is formed as another dense plane consisted of the other end surfaces of the light guide tubes.

In some embodiments, the light guide tubes are selected from at least ones of regular hexagonal light guide tubes, parallelogram light guide tubes, regular triangular light guide tubes and regular octagonal light guide tubes.

In some embodiments, the at least one light guide wall joins the eyeglass component with optical adhesive.

In some embodiments, the eyeglass component comprises: a first aspheric lens for observation by left eye, a second aspheric lens for observation by right eye, and, a first Fresnel lens and a second Fresnel lens disposed around the first aspheric lens and the second aspheric lens, respectively.

In some embodiments, the light outgoing faces of the first Fresnel lens and the second Fresnel lens are embodied as flat faces.

According to another aspect of the present disclosure, there is provided virtual reality spectacles comprising the optical imaging structure of any of the abovementioned embodiments, wherein, the virtual reality spectacles comprise a left lens for observation by left eye, and a right lens for observation by right eye, the eyeglass component of the left lens comprises a first aspheric lens and a first Fresnel lens integrally formed by injection molding, and the eyeglass component of the right lens comprises a second aspheric lens and a second Fresnel lens integrally formed by injection molding; or the virtual reality spectacles comprise an integrated lens for observation by left and right eyes, the eyeglass component of the integrated lens comprises the first aspheric lens, the second aspheric lens, the first Fresnel lens and the second Fresnel lens integrally formed by injection molding.

In some embodiments, a notch for nose is disposed at the middle of a lower side of the eyeglass component.

In some embodiments, the virtual reality spectacles further comprises: a display screen disposed at a light incoming side of the optical imaging structure; wherein, a light outgoing side of the display screen faces the light incoming side of the optical imaging structure.

In some embodiments, the light incoming face of the at least one light guide wall is embodied as a smooth optical face and joins the display screen with optical adhesive.

In some embodiments, the display screen is in a rectangular shape, and a ratio of a length of the display screen from left to right to a width of the display screen from upper to lower is no less than 3:1; or the display screen comprises a first sub display screen and a second sub display screen both being of rectangular shapes, and a ratio of a length of each of the first sub display screen and the second sub display screen from left to right to a width of each of the first sub display screen and the second sub display screen from upper to lower is no less than 1.5:1.

In some embodiments, the light outgoing face of the at least one light guide wall is embodied as a sloping face.

In some embodiments, the at least one light guide wall further comprises a third light guide wall disposed at an upper side of the eyeglass component.

In some embodiments, the light guide wall disposed at the same side of the eyeglass component is formed by adjoining a plurality of light guide tubes paralleled with one another together;

the light incoming face of the light guide wall disposed at the same side of the eyeglass component is formed as a dense plane consisted of end surfaces of the light guide tubes, and the light outgoing face of the light guide wall disposed at the same side of the eyeglass component is formed as another dense plane consisted of the other end surfaces of the light guide tubes; and the light guide tubes are selected from at least ones of regular hexagonal light guide tubes, parallelogram light guide tubes, regular triangular light guide tubes and regular octagonal light guide tubes.

In some embodiments, the at least one light guide wall joins the eyeglass component with optical adhesive.

In some embodiments, the light outgoing faces of the first Fresnel lens and the second Fresnel lens are embodied as flat faces.

DETAILED DESCRIPTION OF THE EMBODIMENTS

Figure 1:
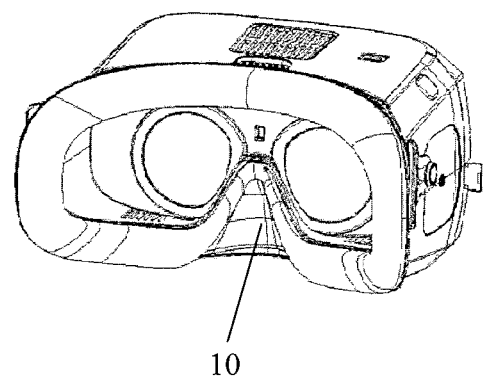
FIG. 1 is a physical picture of a pair of virtual reality spectacles.
Figure 2:
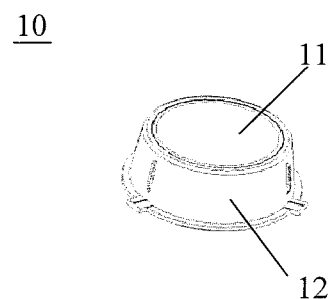
FIG. 2 is a physical picture of an imaging structure.

Referring to FIG. 1, virtual reality spectacles comprise an imaging structure 10. Referring to FIG. 2, the imaging structure 10 comprises lenses 11 and lens cone 12. As shown in FIG. 2, when the virtual reality spectacles are used by a user, its viewing range is only a region which is in the middle and which corresponds to the lenses 11. User's sight will be blocked by the lens cone 12 when he/she wants a greater viewing angle, which causes some of the sight of the user always encounter black obstacles when the user is using the virtual reality spectacles. Accordingly, it is difficult to create a sense of immersion to the user, thereby reducing the user's experience.

Accordingly, an optical imaging structure and virtual reality spectacles are provided according to embodiments of the present disclosure.

In order to provide a more clear understanding of technique solutions of embodiments of the present disclosure, the embodiments of the disclosure will be further described hereinafter in detail and completely with reference to the attached drawings. Obviously, the embodiments illustrated in these drawings are only some of embodiments of the present disclosure, instead of all of the embodiments of the present disclosure. For those skilled in the art, other embodiments achieved by referring to the following embodiments without involving any inventive steps fall into the scope of the present disclosure.

Figure 3:
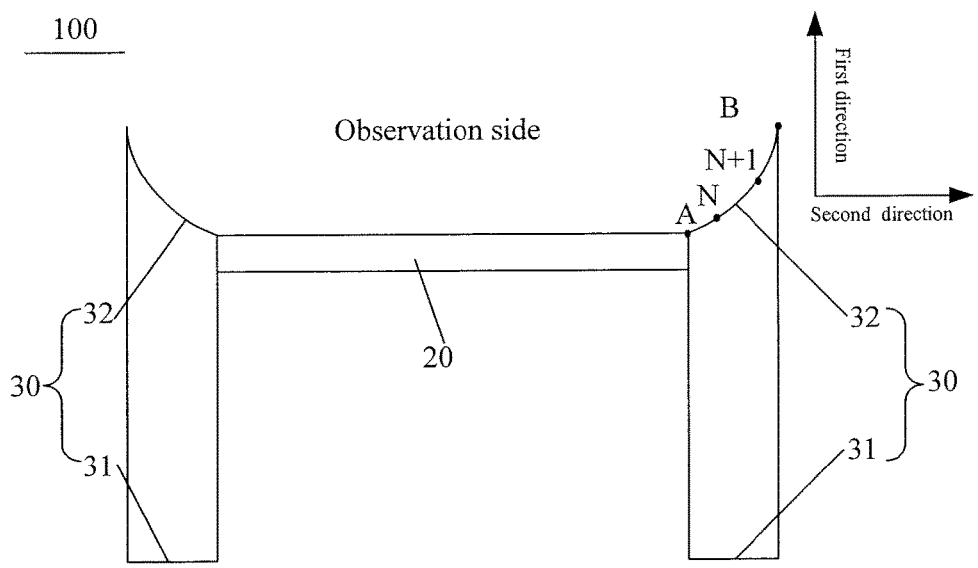
FIG. 3 is a schematic view of an optical imaging structure according to an embodiment of the present disclosure.
Figure 4:
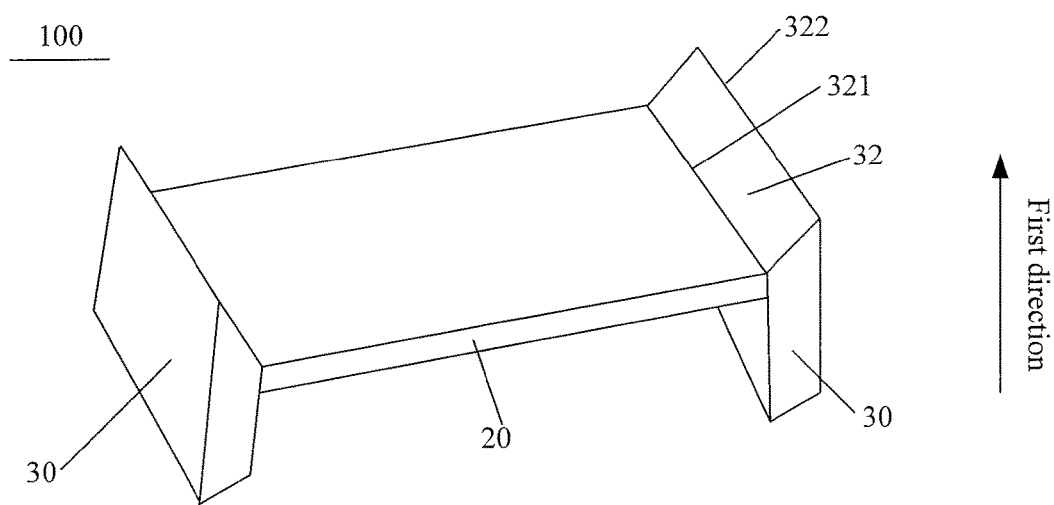
FIG. 4 is a schematic view of an optical imaging structure according to another embodiment of the present disclosure.

According to embodiments of the present disclosure, there are provided virtual reality spectacles, referring to FIG. 3 and FIG. 4, comprising an optical imaging structure 100. The optical imaging structure 100 comprises an eyeglass component 20 for observation by left and right eyes and at least one light guide wall 30 distributed along an edge of the eyeglass component 20. Two opposite end faces of the light guide wall 30 are respectively a light incoming face 31 and a light outgoing face 32, and the light outgoing face 32 of the light guide wall 30 faces towards an observation side of the virtual reality spectacles. The light guide wall 30 protrudes over the eyeglass component 20 in a direction (namely a first direction shown in FIG. 3 and FIG. 4) from the light incoming face 31 to the light outgoing face 32 of the light guide wall 30, an inner rim 321 of the light outgoing face 32 of the light guide wall 30 joins the edge of the eyeglass component 20 and extends in an optical axis direction of the eyeglass component 20, and, the light outgoing face 32 of the light guide wall 30 is gradually distanced from the eyeglass component 20 from the inner rim 321 to an outer rim 322 of the light outgoing face 32. The light guide wall 30 is disposed at least at left and right sides of the eyeglass component 20.

It should be noted that, firstly, those skilled in the art should understand that, once the observation side of the virtual reality spectacles is determined, an observation position for left eye and an observation position for right eye are determined. In this case, a left side of the eyeglass component 20 is namely a left side of the observation position for left eye, while a right side of the eyeglass component 20 is namely a right side of the observation position for right eye. In these embodiments of the present disclosure, the light guide wall 30 is disposed at least at left and right side edges of the eyeglass component 20. Here, "the light guide wall 30 is distributed along an edge of the eyeglass component 20", refers to that, the light guide wall 30 is distributed along an extension direction of a side of the eyeglass component 20.

Secondly, as shown in FIG. 3 and FIG. 4, "the light guide wall 30 protrudes over the eyeglass component 20 in the first direction", refers to that, the light outgoing face 32 of the light guide wall 30 protrudes over a light outgoing face of the eyeglass component 20.

Thirdly, "the inner rim 321 of the light outgoing face 32 of the light guide wall 30 joins the edge of the eyeglass component 20", refers to that, there is no gap between the light guide wall 30 and the edge of the eyeglass component 20, while the inner rim 321 of the light outgoing face 32 of the light guide wall 30 will not protrudes over a plane where the edge of the eyeglass component 20 is located, in the first direction.

Fourthly, "the light outgoing face 32 of the light guide wall 30 is gradually distanced from the eyeglass component 20 from the inner rim 321 to the outer rim 322 of the light outgoing face 32", refers to that, in a side view of the optical imaging structure 100 as shown in FIG. 3, in a direction (namely a second direction shown in FIG. 3) from a point A in the inner rim 321 to a point B in the outer rim 322 of the light outgoing face 32 of the light guide wall 30, points (including the point A and the point B) of the light outgoing face 32 are gradually distanced from the eyeglass component 20 in the first direction.

Herein, "gradually distanced from" refers to that, in a side view of the light outgoing face 32 as shown in FIG. 3, in the second direction, a $(N+1)^{th}$ point is farther away from the eyeglass component 20 than an $N^{th}$ point, and, there will be neither the $(N+1)^{th}$ point is as far away from the eyeglass component 20 as the $N^{th}$ point, nor the $N^{th}$ point is farther away from the eyeglass component 20 than the (N+1)$^{th}$ point. In addition, the point B where the outer rim 322 is located is farthest away from the eyeglass component 20.

Fifthly, regarding the two opposite end faces 31 and 32 of the light guide wall 30, the light outgoing face 32 is the end face closing to the observation side of the virtual reality spectacles, and necessarily, the light incoming face 31 is the end face away from the observation side of the virtual reality spectacles. The extension direction of the light guide wall 30 is the same as an optical axis direction of the eyeglass component 20.

Sixthly, a manner of the connection between the eyeglass component 20 and the light guide wall 30 is not limited specifically according to the embodiments of the present disclosure, as long as a stable connection between the eyeglass component 20 and the light guide wall 30 is achieved.

With the virtual reality spectacles according to the embodiments of the present disclosure, disposition of the light guide wall 30 at left and right side edges of the eyeglass component 20 allows light rays within a viewing range including a region beyond the eyeglass component 20 (but corresponding in position to the light guide wall 30) to go into the user's eyes through the light guide wall 30. In this way, once a user uses the virtual reality spectacles, when he/she takes a greater viewing angle, he/she can get light rays from the region beyond the eyeglass component 20 although there is no clear scene, unlike that in the prior art, the user's sight will be blocked by the lens cone and encounter only black obstacles when he/she wants a greater viewing angle. As a result, the user can get the light rays both within the viewing range of the eyeglass component 20 and within a viewing range of the region which goes beyond the eyeglass component 20 but which corresponds in position to the light guide wall 30, and encounter no black obstacles. Accordingly, the user can be immersed in a virtual world in a better manner, so as to improve the sense of immersion to the user, thereby enhancing the user's experience.

In some embodiments, as shown in FIG. 3, the light outgoing face 32 of the light guide wall 30 is embodied as arced sloping face. In some other embodiments, as shown in FIG. 4, the light outgoing face 32 of the light guide wall 30 is embodied as sloping plane.

In an embodiment, in the first direction, the outer rim 322 of the light outgoing face 32 is farthest away from the eyeglass component 20.

In order to enhance viewing effect, in the first direction, a distance from the outer rim 322 of the light outgoing face 32 to the eyeglass component 20 should be greater than a distance from eyes of the user when he/she wears the virtual reality spectacles to the eyeglass component 20.

In some embodiments of the present disclosure, the light outgoing face 32 of the light guide wall 30 is embodied as sloping plane. This not only facilitates to manufacture the light guide wall 30, but also allows light rays from the light guide wall 30 to go into the user's eyes hierarchically, so as to further improve the sense of immersion to the user.

Figure 5:
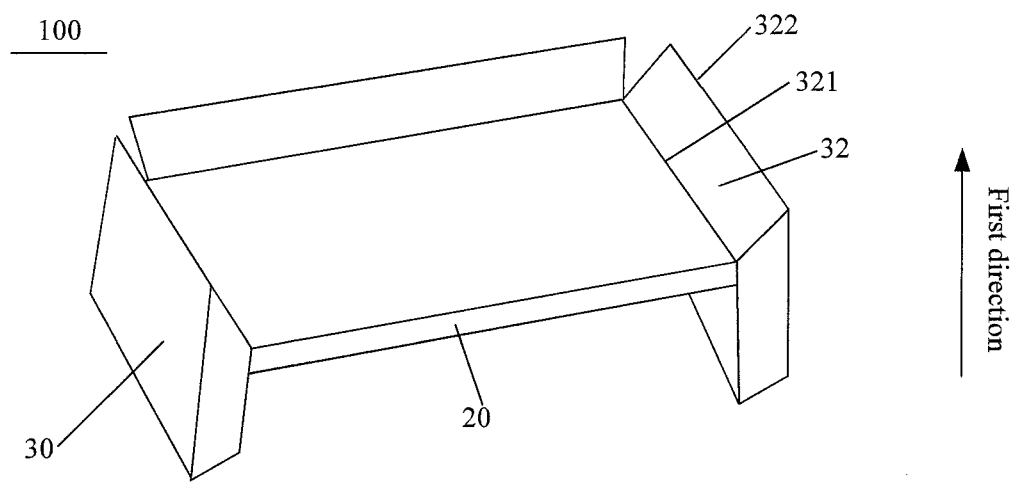
FIG. 5 is a schematic view of an optical imaging structure according to yet another embodiment of the present disclosure.

In some other embodiments of the present disclosure, referring to FIG. 5, a light guide wall 30 is further disposed at an upper side of the eyeglass component 20.

It should be noted that, once the left side, the right side, and the observation side of the eyeglass component 20 are determined, the upper side of the eyeglass component 20 is also determined. The light guide wall 30 is disposed at an upper side edge of the eyeglass component 20.

According to these embodiments of the present disclosure, with further provision of the light guide wall 30 at the upper side of the eyeglass component 20, the user can encounter no black obstacles when he/she gets light rays from the upper side of the eyeglass component 20, which further improves the sense of immersion to the user.

Figure 6:
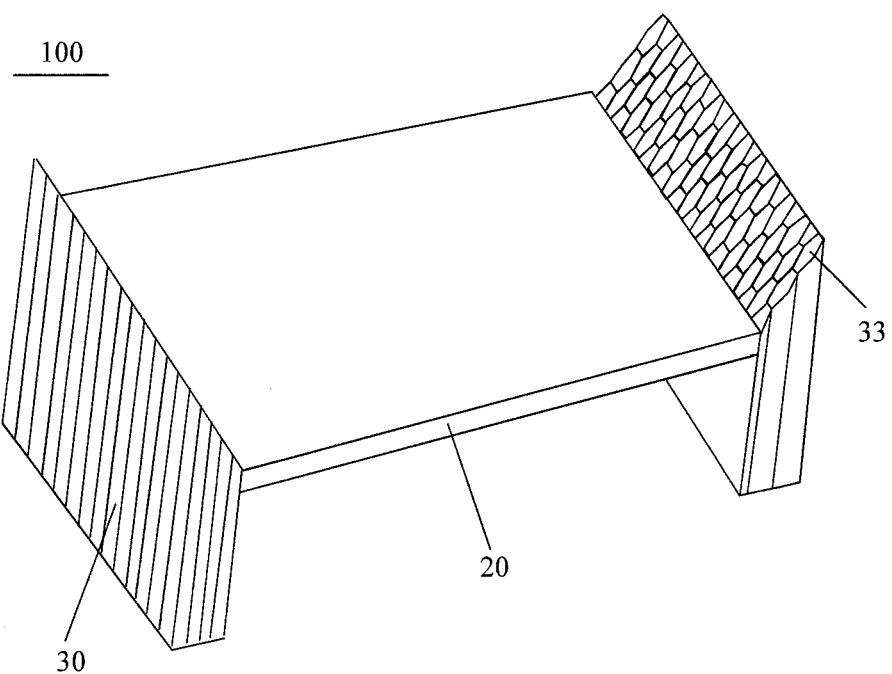
FIG. 6 is a schematic view of an optical imaging structure according to still another embodiment of the present disclosure.

Due to good light guide effect and low cost of the light guide tube, in the embodiments of the present disclosure, referring to FIG. 6, the light guide wall 30 disposed at the same side of the eyeglass component 20 is formed by adjoining a plurality of light guide tubes 33 paralleled with one another together.

Specifically, the light incoming face 31 and the light outgoing face 32 of the light guide wall 30 are formed by end surfaces of the plurality of light guide tubes 33, although shape of the end surfaces of the light guide tubes 33 is not limited specifically according to the embodiments of the present disclosure.

In addition, the light guide tubes 33 may be arranged in one row along the edge of the eyeglass component 20, or may be arranged, as shown in FIG. 6, in several rows along the edge of the eyeglass component 20. They can be set reasonably according to configuration of the optical imaging structure 100.

In addition, manner of connections between the light guide tubes 33 is not limited specifically according to the embodiments of the present disclosure, for example, the connections may be achieved by ordinary glue or by optical adhesive.

In some embodiments, referring to FIG. 6, the light incoming face 31 of the light guide wall 30 disposed at the same side of the eyeglass component 20 is formed as a dense plane consisted of end surfaces of the light guide tubes 33, and the light outgoing face 32 of the light guide wall 30 disposed at the same side of the eyeglass component 20 is formed as another dense plane consisted of the other end surfaces of the light guide tubes 33.

The "dense plane" refers to a surface which is obtained by joining one or more planar graphs with the same shape and size together, with no space and no overlapping therebetween.

According to the embodiments of the present disclosure, the light incoming face 31 and the light outgoing face 32 of the light guide wall 30 are formed as dense planes consisted of the end surfaces of the light guide tubes 33, such that light rays at the region where the light guide wall 30 is located can pass through the light guide tubes 33 and thus no black obstacles will occur, which further improves the sense of immersion to the user.

In particular, the light guide tubes are selected from at least ones of regular hexagonal light guide tubes, parallelogram light guide tubes, regular triangular light guide tubes and regular octagonal light guide tubes.

That is to say, the light guide wall 30 may be consisted of only regular triangular light guide tubes, of only regular hexagonal light guide tubes, or of only parallelogram light guide tubes; or may be consisted of regular triangular light guide tubes and parallelogram light guide tubes together, of regular triangular light guide tubes and regular hexagonal light guide tubes together, or of parallelogram light guide tubes and regular octagonal light guide tubes together. For example, in the embodiment shown in FIG. 6, the light guide wall 30 is consisted of only regular hexagonal light guide tubes.

In order to reduce optical loss of the light rays, according to the embodiments of the present disclosure, the light guide wall 30 joins the eyeglass component 20 with optical adhesive.

In one embodiment, when the light guide wall 30 is formed by adjoining the light guide tubes 30 together, the light guide tubes 33 adjoined to the edge of the eyeglass component 20 join the eyeglass component 20 with optical adhesive.

Figure 7:
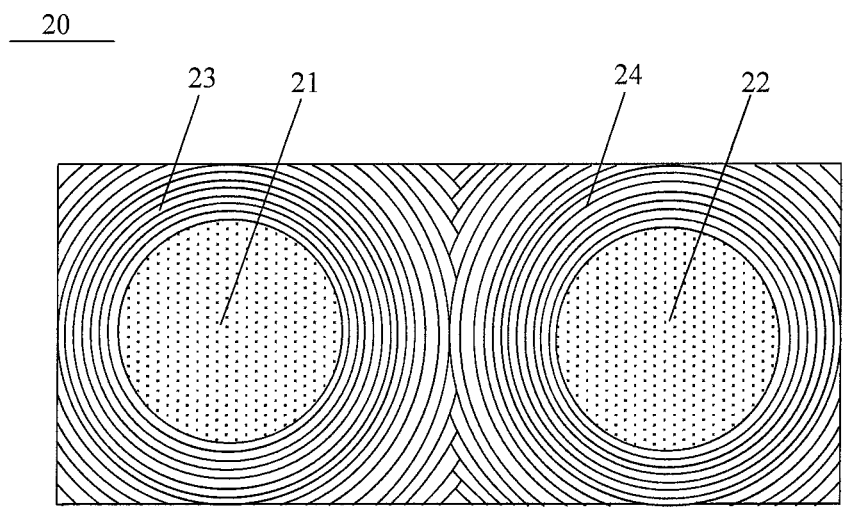
FIG. 7 is a schematic view of an eyeglass component according to an embodiment of the present disclosure.

In some embodiments, referring to FIG. 7, the eyeglass component 20 comprises: a first aspheric lens 21 for observation by left eye, a second aspheric lens 22 for observation by right eye, and, a first Fresnel lens 23 and a second Fresnel lens 24 disposed around the first aspheric lens 21 and the second aspheric lens 22, respectively.

In order to ensure high resolution ratios of the first aspheric lens 21 and the second aspheric lens 22, according to the embodiments of the present disclosure, each of the first aspheric lens 21 and the second aspheric lens 22 has its viewing angle in the range of 0°~15°, and its Modulation Transfer Function (MTF) value of greater than 90%. In order to ensure that pictures within effective viewing field of human's eye can be observed clearly, according to the embodiments of the present disclosure, each of the first Fresnel lens 23 and the second Fresnel lens 24 has its viewing angle in the range of 15°~45°.

According to the embodiments of the present disclosure, the eyeglass component 20 is formed by joining the first aspheric lens 21, the second aspheric lens 22, the first Fresnel lens 23 and the second Fresnel lens 24 together, which not only ensures resolution ratio and light transmittance of the eyeglass component 20 but also avoids the eyeglass component 20 to be heavy.

In some embodiments, the light outgoing faces of the first Fresnel lens 23 and the second Fresnel lens 24 are embodied as flat faces.

Specifically, the light outgoing faces of the first Fresnel lens 23 and the second Fresnel lens 24 refer to the flat faces closing to the observation side.

In addition, in the design of the first Fresnel lens 23 and the second Fresnel lens 24 disposed respectively around the first aspheric lens 21 and the second aspheric lens 22, it should be noted that, curvatures of the first Fresnel lens 23 and the second Fresnel lens 24 require to match respectively curvatures of edges of the first aspheric lens 21 and the second aspheric lens 22, in order to avoid abrupt changes in picture at the matching places.

According to the embodiments of the present disclosure, the light outgoing faces of the first Fresnel lens 23 and the second Fresnel lens 24 are flat faces, which facilitate cleaning of the eyeglass component 20.

In some embodiments, the virtual reality spectacles comprise a left lens for observation by left eye, and a right lens for observation by right eye, the eyeglass component of the left lens comprises a first aspheric lens 21 and a first Fresnel lens 23 integrally formed by injection molding, and the eyeglass component of the right lens comprises a second aspheric lens 22 and a second Fresnel lens 24 integrally formed by injection molding.

Figure 8:
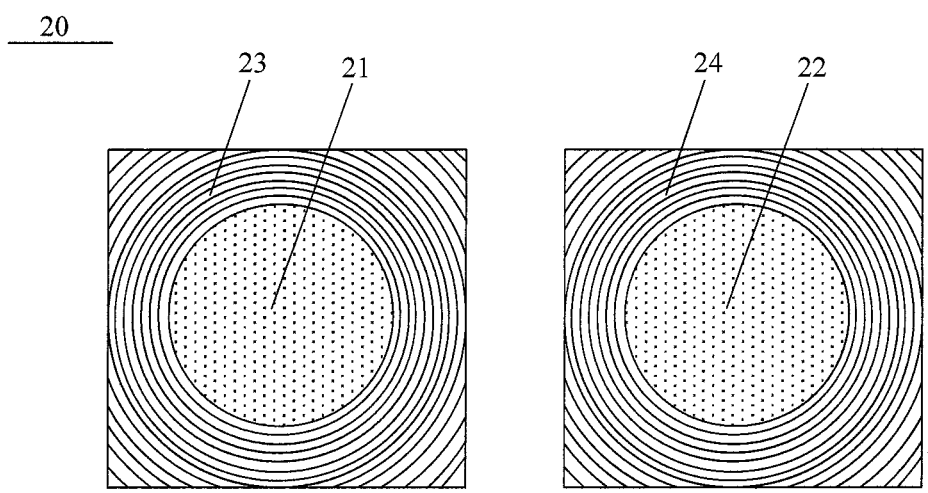
FIG. 8 is a schematic view of an eyeglass component according to another embodiment of the present disclosure.

That is to say, referring to FIG. 8, the eyeglass component 20 is consisted of two sub eyeglass components each corresponding to one lens. Of course, those skilled in the art should understand, a connection unit is required to be provided to connect the left lens and the right lens together.

In this case, the light guide wall 30 disposed at the left side of the eyeglass component 20 is disposed at the left side of the left lens, and the light guide wall 30 disposed at the right side of the eyeglass component 20 is disposed at the right side of the right lens.

In some other embodiments, the virtual reality spectacles comprise an integrated lens for observation by left and right eyes, the eyeglass component of the integrated lens comprises, referring to FIG. 7, the first aspheric lens 21, the second aspheric lens 22, the first Fresnel lens 23 and the second Fresnel lens 24 integrally formed by injection molding.

In the above embodiments of the present disclosure, the first aspheric lens 21, the second aspheric lens 22, the first Fresnel lens 23 and the second Fresnel lens 24 are integrally formed by injection molding, which ensures that the aspheric lenses and the Fresnel lenses are made of the same material and they are connected seamlessly, and thus optical loss can be reduced.

Figure 9:
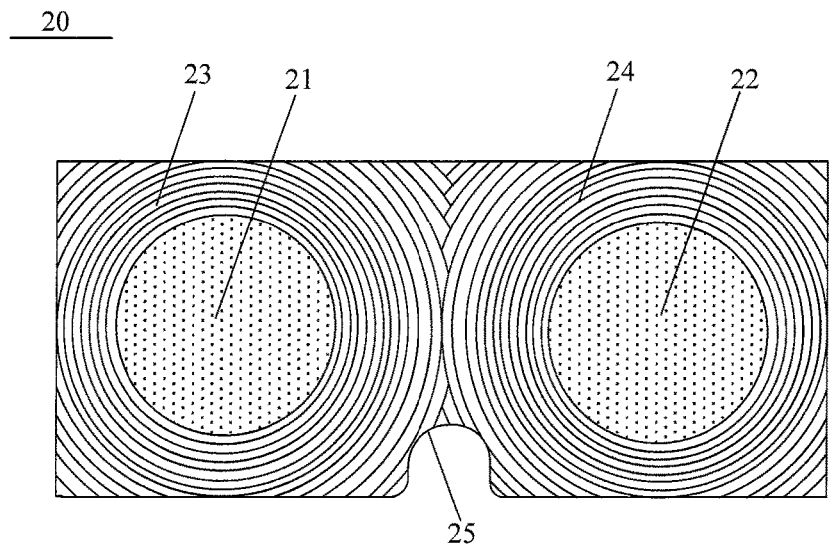
FIG. 9 is a schematic view of an eyeglass component according to yet another embodiment of the present disclosure.

In some embodiments, referring to FIG. 9, a notch 25 for nose is disposed at the middle of a lower side of the eyeglass component 20.

The lower side of the eyeglass component 20 refers to a side opposite to the upper side of the eyeglass component 20.

According to the embodiments of the present disclosure, provision of the notch 25 for nose in the eyeglass component 20 can improve wear comfort of the user.

Figure 10:
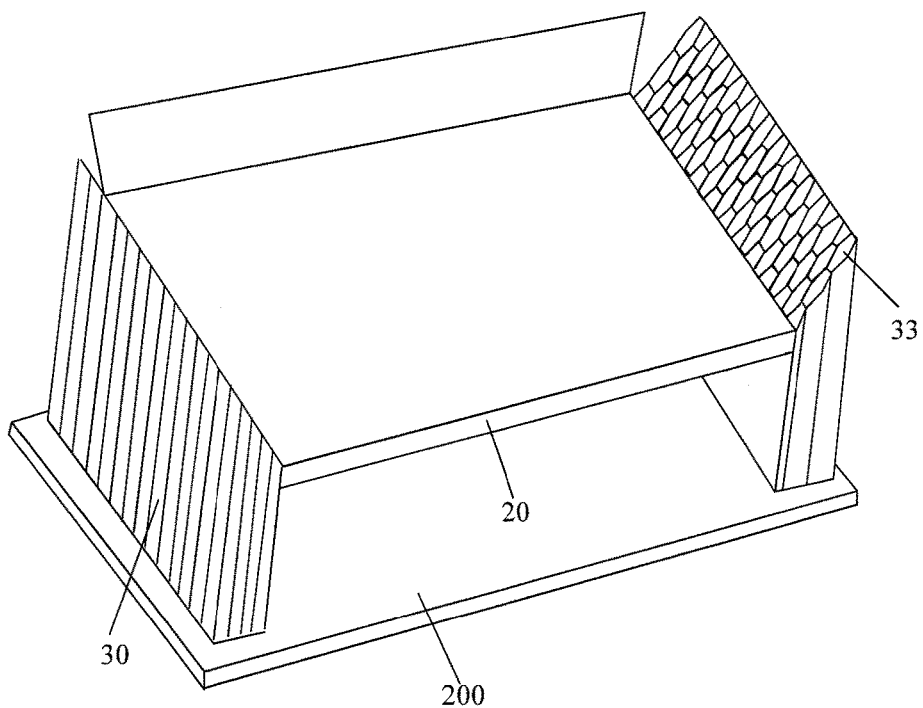
FIG. 10 is a schematic view of virtual reality spectacles according to an embodiment of the present disclosure.
Figure 11:
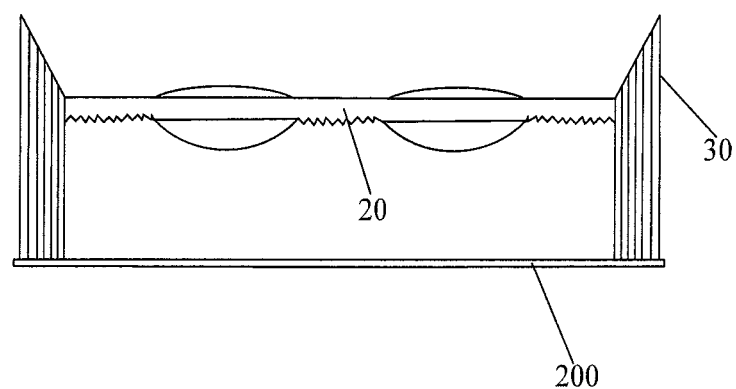
FIG. 11 is a schematic view of virtual reality spectacles according to another embodiment of the present disclosure.

In some embodiments, referring to FIG. 10 and FIG. 11, the virtual reality spectacles further comprise a display screen 200 disposed at a light incoming side of the optical imaging structure 100; wherein, a light outgoing side of the display screen 200 faces the light incoming side of the optical imaging structure 100.

Specific types of the display screen 200 are not limited according to the embodiments of the present disclosure. For example, it may be a liquid crystal display screen, or may be an organic light emitting diode display screen, or else other display screens.

In some embodiments, the light incoming face of the light guide wall 30 is embodied as a smooth optical face and joins the display screen 200 with optical adhesive.

According to the embodiments of the present disclosure, the light incoming face of the light guide wall 30 is embodied as a smooth optical face and joins the display screen 200 with optical adhesive, which not only can reduce the impact of the light guide wall 30 to the display screen 200 by the optical adhesive so as to prevent the display screen 200 from being broken, but also can allow the light rays coming from the display screen 200 to go into human's eye through the light guide wall 30 in a better manner.

In some embodiments, referring to FIG. 10 and FIG. 11, the display screen 200 is in a rectangular shape, and a ratio of a length of the display screen 200 from left to right to a width of the display screen from upper to lower is no less than 3:1.

In some embodiments, the display screen 200 further comprises a first sub display screen and a second sub display screen both being of rectangular shapes, and a ratio of a length of each of the first sub display screen and the second sub display screen from left to right to a width of each of the first sub display screen and the second sub display screen from upper to lower is no less than 1.5:1.

According to the embodiments of the present disclosure, limitations on the ratio of length to width of the display screen 200 can enlarge a viewing field of the display screen 200 in horizontal direction and thus improve the viewing effect.

The above merely are specific embodiments of the present disclosure, but the scope of the present disclosure is not limited to this. It will be apparent for those skilled in the art that some changes and modifications on these embodiments may be made without departing from the principles and spirit of the present disclosure, the scope of which is defined in the claims.

What is claimed is:

1. An optical imaging structure, comprising:
   an eyeglass component for observation by left and right eyes; and
   at least one light guide wall distributed along an edge of the eyeglass component, wherein, two opposite end faces of the at least one light guide wall are respectively a light incoming face and a light outgoing face, and the light outgoing face of the at least one light guide wall faces towards an observation side of the optical imaging structure;
   wherein, the at least one light guide wall protrudes over the eyeglass component in a direction from the light incoming face to the light outgoing face of the at least one light guide wall, an inner rim of the light outgoing face of the at least one light guide wall joins the edge of the eyeglass component and extends in an optical axis direction of the eyeglass component, and, the light outgoing face of the at least one light guide wall is gradually distanced from the eyeglass component from the inner rim to an outer rim of the light outgoing face; and
   wherein, the at least one light guide wall comprises at least a first light guide wall and a second light guide wall respectively disposed at left and right sides of the eyeglass component.

2. The optical imaging structure of claim 1, wherein, the light outgoing face of the at least one light guide wall is embodied as a sloping face.

3. The optical imaging structure of claim 1, wherein, the at least one light guide wall further comprises a third light guide wall disposed at an upper side of the eyeglass component.

4. The optical imaging structure of claim 1, wherein, the light guide wall disposed at the same side of the eyeglass component is formed by adjoining a plurality of light guide tubes paralleled with one another together.

5. The optical imaging structure of claim 4, wherein, the light incoming face of the light guide wall disposed at the same side of the eyeglass component is formed as a dense plane consisted of end surfaces of the light guide tubes, and the light outgoing face of the light guide wall disposed at the same side of the eyeglass component is formed as another dense plane consisted of the other end surfaces of the light guide tubes.

6. The optical imaging structure of claim 5, wherein, the light guide tubes are selected from at least ones of regular hexagonal light guide tubes, parallelogram light guide tubes, regular triangular light guide tubes and regular octagonal light guide tubes.

7. The optical imaging structure of claim 1, wherein, the at least one light guide wall joins the eyeglass component with optical adhesive.

8. The optical imaging structure of claim 1, wherein, the eyeglass component comprises: a first aspheric lens for observation by left eye, a second aspheric lens for observation by right eye, and, a first Fresnel lens and a second Fresnel lens disposed around the first aspheric lens and the second aspheric lens, respectively.

9. The optical imaging structure of claim 8, wherein, the light outgoing faces of the first Fresnel lens and the second Fresnel lens are embodied as flat faces.

10. Virtual reality spectacles comprising the optical imaging structure of claim 1, wherein,
    the virtual reality spectacles comprise a left lens for observation by left eye, and a right lens for observation by right eye, the eyeglass component of the left lens comprises a first aspheric lens and a first Fresnel lens integrally formed by injection molding, and the eyeglass component of the right lens comprises a second aspheric lens and a second Fresnel lens integrally formed by injection molding; or
    the virtual reality spectacles comprise an integrated lens for observation by left and right eyes, the eyeglass component of the integrated lens comprises the first aspheric lens, the second aspheric lens, the first Fresnel lens and the second Fresnel lens integrally formed by injection molding.

11. The virtual reality spectacles of claim 10, wherein, a notch for nose is disposed at the middle of a lower side of the eyeglass component.

12. The virtual reality spectacles of claim 10, further comprising: a display screen disposed at a light incoming side of the optical imaging structure; wherein, a light outgoing side of the display screen faces the light incoming side of the optical imaging structure.

13. The virtual reality spectacles of claim 12, wherein, the light incoming face of the at least one light guide wall is embodied as a smooth optical face and joins the display screen with optical adhesive.

14. The virtual reality spectacles of claim 12, wherein, the display screen is in a rectangular shape, and a ratio of a length of the display screen from left to right to a width of the display screen from upper to lower is no less than 3:1; or
    the display screen comprises a first sub display screen and a second sub display screen both being of rectangular shapes, and a ratio of a length of each of the first sub display screen and the second sub display screen from left to right to a width of each of the first sub display screen and the second sub display screen from upper to lower is no less than 1.5:1.

15. The virtual reality spectacles of claim 10, wherein, the light outgoing face of the at least one light guide wall is embodied as a sloping face.

16. The virtual reality spectacles of claim 10, wherein, the at least one light guide wall further comprises a third light guide wall disposed at an upper side of the eyeglass component.

17. The virtual reality spectacles of claim 10, wherein,
    the light guide wall disposed at the same side of the eyeglass component is formed by adjoining a plurality of light guide tubes paralleled with one another together;
    the light incoming face of the light guide wall disposed at the same side of the eyeglass component is formed as a dense plane consisted of end surfaces of the light guide tubes, and the light outgoing face of the light guide wall disposed at the same side of the eyeglass component is formed as another dense plane consisted of the other end surfaces of the light guide tubes; and
    the light guide tubes are selected from at least ones of regular hexagonal light guide tubes, parallelogram light guide tubes, regular triangular light guide tubes and regular octagonal light guide tubes.

18. The virtual reality spectacles of claim 10, wherein, the at least one light guide wall joins the eyeglass component with optical adhesive.

19. The virtual reality spectacles of claim 10, wherein, the light outgoing faces of the first Fresnel lens and the second Fresnel lens are embodied as flat faces.

\* \* \* \* \*